May 11, 1937.  J. N. JANDA  2,079,741
CALF WEANER
Filed May 7, 1935   2 Sheets-Sheet 1
Fig. 1.
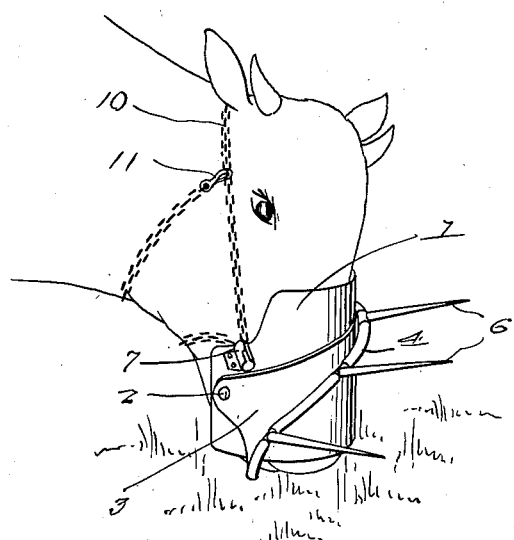
Fig. 6.
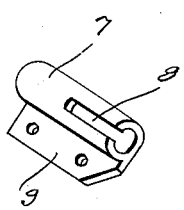
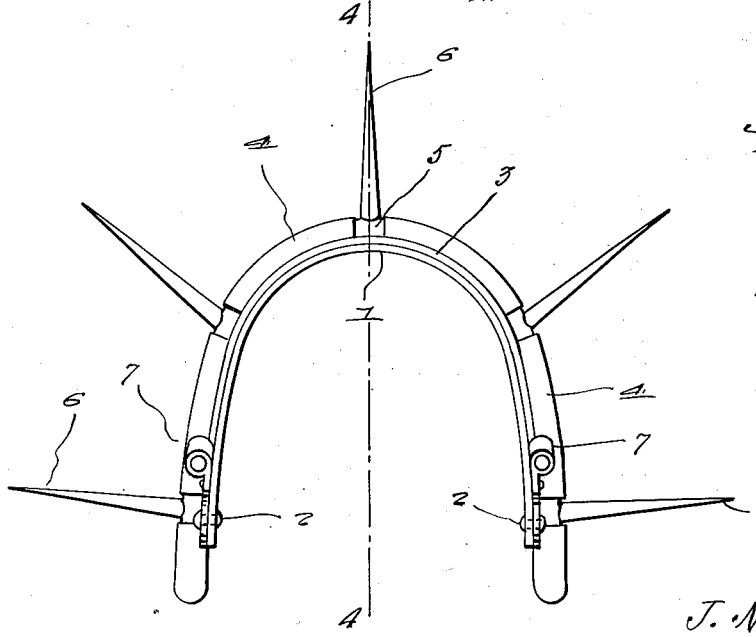
Fig. 3.
Inventor
J. N. Janda
By Clarence A. O'Brien
Attorney May 11, 1937.  J. N. JANDA  2,079,741
CALF WEANER
Filed May 7, 1935   2 Sheets-Sheet 2
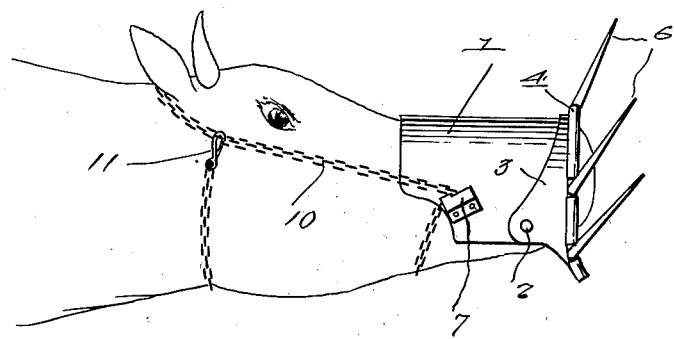
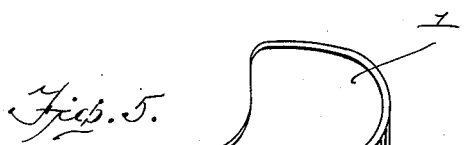
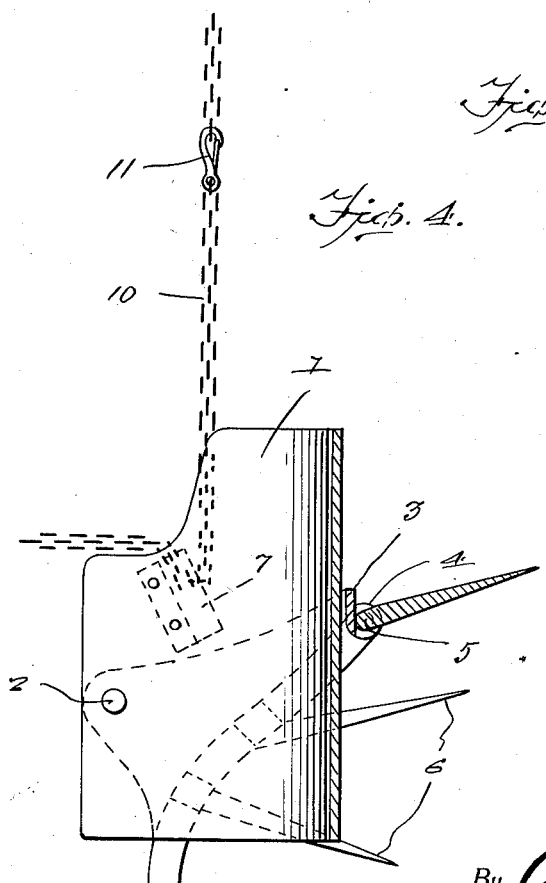
Inventor
J. N. Janda
By Clarence A. O'Brien
Attorney Patented May 11, 1937

2,079,741

UNITED STATES PATENT OFFICE 2,079,741

CALF WEANER

Josef N. Janda, Wilber, Nebr., assignor of one-half to Mary Marcella Dvorak, Wilber, Nebr.

Application May 7, 1935, Serial No. 20,270

2 Claims. (Cl. 119—130)

The present invention relates to new and useful improvements in calf weaners and has for its primary object to provide, in a manner as hereinafter set forth, a device of this character comprising a construction and arrangement which is such that, while preventing nursing, said device will interfere in no way with grazing by the animal.

Another important object of the invention is to provide a weaner of the aforementioned character which includes novel adjustable securing means for mounting the device on the animal's head.

Other objects of the invention are to provide a weaner of the character described which will be comparatively simple in construction, strong, durable, highly efficient and reliable in use, compact, and light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view illustrating the device as it appears when the animal is grazing.

Figure 2 is a view illustrating the weaner as it appears when the animal lifts its head to attempt to nurse.

Figure 3 is a view in end elevation of the invention.

Figure 4 is a vertical sectional view through the device taken substantially on the line 4—4 of Figure 3.

Figure 5 is a detail view in perspective of the substantially U-shaped nose piece.

Figure 6 is a detail view in perspective of the means for adjustably securing the attaching chain.

Referring now to the drawings in detail, it will be seen that the embodiment of the invention which has been illustrated comprises a substantially U-shaped nose piece 1 of suitable metal having pivotally mounted thereon at an intermediate point, as at 2, a substantially U-shaped plate 3 which is also of suitable metal. The member 1 is adapted to be mounted on the nose of the animal in the manner illustrated to advantage in Figures 1 and 2 of the drawings.

One of the marginal portions of the plate 3 is formed to provide spaced rolls 4 for the reception of a metallic rod or wire 5. Spurs 6 of suitable length project from the rod 5. It will thus be seen that the spurs 6 are adapted to swing between the positions shown in Figures 1 and 2 of the drawings.

Rigidly mounted on the sides of the nose piece 1 are tubes 7 having slots or notches 8 therein (see Figure 6). The tubes 7 have formed integrally therewith apertured attaching flanges 9. The tubes 7 are for the passage of a slidably adjustable attaching chain 10 having snap-hooks 11 on its ends. As is thought to be apparent, the chain 10 is adjusted to the desired position in the tubes 7 and then engaged in the retaining slots or notches 8. It will be noted that the chain 10, starting from one of the snap-hooks 11, passes downwardly through the left hand tube 7 (see Figure 4) and around the jaw of the animal, through the other tube 7, then upwardly over the animal's head behind the ears and down to where it is connected, at an intermediate point, to said one snap-hook, then beneath the animal's neck, the other snap-hook then being engaged with the head engaging portion of said chain.

It is thought that the operation of the device will be readily apparent from a consideration of the foregoing. When the animal places its muzzle to the surface of the ground, as in Figure 1, the pivoted plate 3, carrying the prongs 6, is elevated to inoperative position by the engagement of the endmost parts 4 with the ground so as not to interfere with grazing by the animal. However, should the animal raise its head and attempt to nurse, as illustrated in Figure 2, the plate 3 swings by gravity to operative position and rests on the forward or lower end portion of the nose piece 1, in which position the prongs 6 will prevent contact. By adjusting the chain in the tubes 7 various conditions may be successfully met. While the device is intended primarily for use on calves, it may also be successfully used on heifers or full grown animals.

It is believed that the many advantages of a calf weaner constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A calf weaner comprising a substantially U-shaped nose piece, means for securing said nose piece in position on an animal's head, a substantially U-shaped plate mounted for swinging movement on said nose piece, a rod secured on said plate, and prongs projecting from said rod, said plate resting by gravity on the nose piece when in operative position.

2. A weaner of the class described comprising a substantially U-shaped nose piece, means for securing said nose piece on an animal's head, a substantially U-shaped plate pivotally secured, at its ends, to said nose piece for swinging movement, rolls on one of the marginal portions of said plate, a rod extending through said rolls, and prongs projecting from said rod, the endmost rolls being engageable with the ground for elevating the plate to inoperative position, said plate, when in operative position, resting by gravity on the nose piece.

JOSEF N. JANDA.